United States Patent Office 2,755,301
Patented July 17, 1956

2,755,301

HIGH MOLECULAR WEIGHT NITRILES DERIVED FROM MICROCRYSTALLINE WAX OXIDATE ACIDS

John Walter Nelson, Lansing, and John W. Teter, Chicago, Ill., assignors to Sinclair Refining Company, New York, N. Y., a corporation of Maine No Drawing. Application January 21, 1953,
Serial No. 332,504

4 Claims. (Cl. 260—465.2)

This invention relates to a new, useful group of nitriles of high molecular weight and of a high degree of purity and to a method for their preparation. In particular, it relates to the preparation of nitriles from wax acid mixtures of high molecular weight prepared by conversion of $C_{34}$ to $C_{55}$ microcrystalline wax under controlled oxidation conditions.

John Walter Nelson Patent No. 2,610,974 discloses high molecular weight organic acid compositions and a general method for their preparation. The acid compositions are especially characterized by saponification numbers in the range of about 100 to 500, high content of fatty acid molecules having upwards of 18 carbon atoms, and low solubility in water. Essentially, it discloses that the acid compositions can be prepared by oxidizing microcrystalline waxes having 34 to 55 carbon atoms per molecule in the presence of a stoichiometric excess of oxygen and about 0.1 to 4.0 per cent by weight of an oxidation catalyst at a temperature in excess of about 100° C. for a period of time sufficient to effect substantially complete conversion of the wax to acids. The reaction mass essentially comprises a mixture of carboxylic acids of high molecular weight contaminated with small quantities of organic and inorganic materials such as side reaction products, unreacted waxes, color bodies, and catalyst material. The composition is particularly characterized by the presence of a substantial portion of monobasic fatty acids having an unusually high molecular weight, of over 18 carbon atoms per molecule and varying up to 40 or more.

The crude wax acids are advantageously purified, for example, by the dual extraction procedure disclosed in the copending application of John Walter Nelson, Serial No. 179,758, filed August 16, 1950, now Patent No. 2,698,336. This procedure essentially comprises contacting the crude oxidate composition with a lower boiling oxygen-containing organic polar solvent at a ratio of solvent to oxidate of between about 6:1 to 10:1 by weight and under conditions of temperature and pressure whereby the solvent is maintained in liquid phase. The extract phase is separated and the oxidate recovered therefrom is contacted with a saturated hydrocarbon solvent of a group containing 3 to 12 carbon atoms per molecule at a ratio of solvent to oxidate between about 2:1 to 12:1 by weight and under conditions of temperature and pressure whereby the solvent is maintained in liquid phase. The purified wax acids are recovered from the solvent mixture.

In the conventional preparation of nitriles, fatty acids are heated to temperatures of the order of 300° C., ammonia vapor is led into the body of molten fatty acids during the course of the heating, and water formed during the course of the reaction is continuously distilled or vaporized from the reaction mixture. Purified wax acids prepared, for example, by the processes of the aforementioned Nelson patent and patent application, however, are unstable at the high temperatures ordinarily required for the formation of nitriles, i. e. about 300° C., and readily decompose even in the presence of substantial quantities of ammonia. In addition, even after purification the wax acids usually contain lactones or lactides, and although water is formed as a reaction product of the ammonia and acid, this water apparently does not cleave the lactones and/or lactides present, thereby reducing nitrile yield.

We have now found that nitriles can be prepared from high molecular weight microcrystalline wax acids by a novel process involving the addition of water to the purified wax acids, ammoniation of the acids in liquid phase in the presence of water, and release of water initially added to the purified wax acids and the water formed in the course of decomposition of the ester and amide intermediates in several reaction stages. The water addition prevents excess carbonization of the purified wax acids and/or nitriles when heated to high temperatures and permits separation of a light colored product in high yield.

The nitriles of our invention are prepared from purified carboxy acids of at least 18 carbon atoms per molecule obtained from the controlled oxidation of microcrystalline wax containing 35 to 55 carbon atoms per molecule by continuously introducing an excess of gaseous ammonia into the purified carboxy acids in liquid phase in a reaction zone in the presence of from about 1 to 10 moles of water per mole of acid, i. e. a substantial excess of the stoichiometrical amount of water required for hydrolysis of the esters contained in the purified carboxy acids. The ester content can be readily estimated by calculation based upon the difference between the acid number and the saponification number of the starting mixture. By mole of acid we mean the amount corresponding to the molecular weight of the purified acids based on the saponification number.

The mixture is heated and stirred during ammoniation to a temperature in the range of about 90° to 95° C. which temperature is maintained for about 45 to 60 minutes, and the temperature is then raised to 290° to 310° C. Added water not absorbed in the reaction mass and water formed by the reaction is removed from the reaction zone in the form of vapor. Advantageously, during the period required to raise the temperature from 150° C. to 250° C., i. e., the probable temperature range conducive to the formation of amides, the introduction of ammonia is discontinued. Additional water in the form of steam may be added together with ammonia during the ammoniation stage further to reduce carbonization.

The new nitriles are obtained as a mixture in the form of tan or brownish waxy solids having a saponification number in the range of about 20 to 100. When fractionated, the products are water white to yellow in color. The waxy solids are principally made up of nitriles of varying structure, but in particular containing substantial amounts of mononitriles of unusually high molecular weight, that is over eighteen carbon atoms per molecule. The high molecular weight nitriles of our invention are valuable themselves but are especially useful in the preparation of other organic compounds. For example, high molecular weight amines, prepared by hydrogenation of the nitriles have value as surface active agents, as ore flotation agents and the like.

Several typical compositions containing the high molecular weight nitriles of our invention were prepared and analyzed. The compositions were prepared from microcrystalline wax acids which had been subjected either to an alcohol extraction or to a dual alcohol-hydrocarbon solvent extraction. Approximately one mol of the acids was charged in each instance either alone or together with from about 1 to about 12 moles of water. Without added water, reaction products were dark in color indicating decomposition of the reaction mixture. These products contrast with nitrile compositions prepared from commercial stearic acid without added water in which the products were not carbonized. Color improvement was substantial when only about 1 mol of water was added to the microcrystalline wax acid mixture.

In the various preparations, 64 to 83 weight per cent recovery was obtained. The loss in weight is probably explained by loss of water from the carboxyl group and to dehydrogenation at the hydroxyl group, in addition to the loss of low molecular weight acids, amides or nitriles nitrile formation, the saponification and acid numbers of the final products indicate that the products from the runs in which more than 150 g. of water were added have significantly lower acid and saponification numbers than those products from runs in which no water was employed. The results of the analyses of our novel nitrile compositions are presented below.

| Charge Stock | | | | Reaction Product | | | | | |
|---|---|---|---|---|---|---|---|---|---|
| Purification Method | Sap. # | Moles Acid | Added Water, Grams | Weight Percent of Charge | Percent N | Sap. # | Acid # | I₂ # | Color |
| Dual ext | 225 | 1.1 | None | 72 | 0.03 | 41 | 38 | 34.3 | Very Black. |
| Do | 199 | 1.1 | None | 80 | 3.06 |  | 13 | 33.2 | Black. |
| Alcohol ext | 293 | 1.2 | None | 69 | 3.43 | 35 | 17 | 52.4 | Carbonized product. |
| Do | 251 | 0.85 | None | 83 | 1.59 | 73 | 43 | 50.4 | Coke formation. |
| Dual Ext | 204 | 1.1 | 21 | 83 | 2.92 | 52 | 16 | 32.6 | Color improvement. |
| Do | 202 | 1.2 | 150 | 70 | 2.69 |  | 5 | 42.1 | Light colored product. |
| Do | 192 | 0.95 | 150 | 70 | 2.6 | 30 | 8 | 23 | Do. |
| Alcohol ext | 199 | 1.3 | 220 | 64 | 2.5 | 27 | 4 | 41 | Do. |
| Do | 219 | 1.5 | 220 | 72 | 3.5 | 7 | 8 | 31 | Do. |
| Stearic acid | 195 |  | None | 88 | 5.04 | 8 | 4 | 6.5 | Not carbonized. | by distillation of these light ends. Recovered added water analyzed 80 per cent water and contained acids and nitrogen. Fischer water analysis indicated over a mole of water was absorbed in the reaction mass. Overheads obtained during the reaction were divided into oil and water layers. Both layers had appreciable nitrogen and acid analyses, as would be expected. The water layer contained approximately 50 per cent water and the oil layer 1 per cent. These indicated 1½ moles of water formed during the reaction but not enough for the "theoretical" since about two mols should form from the carboxyl group and about one-third mol from the hydroxyl group. The less than "theoretical" amount of water formed during the reaction might be explained by (a) incomplete addition of nitrogen or (b) incomplete nitrile formation, i. e., only amide formation.

In order to insure maximum yield of nitriles the reactions were continued until only a solid overhead was obtained and were operated 100° C. over the amide formation temperature. The overhead receiver was changed when the temperature reached 200° C. In addition to per cent nitrogen as a measure of the completeness of The nitrile composition listed seventh in the above table from dual extracted microcrystalline wax acids having a saponification number of 192 was prepared by the following procedure. To 0.95 mole of acid were added 150 grams of water. Ammonia was continuously introduced and the mass was continuously heated and stirred throughout the preparation. When a temperature of 90° C. had been reached, it was maintained for 45 minutes after which it was brought up to 300° C. Introduction of ammonia was discontinued during the period required to raise the temperature from 150° C. to 250° C. The overhead receiver was changed when the temperature reached 200° C. and the reaction was continued until only a solid overhead was obtained.

In order further to establish the composition, structure, and properties of the high molecular weight nitriles, two typical preparations designated Nitriles A and B were subjected to semi-micro distillation and analyses. The results presented below indicate the unusual character of the compositions of our invention.

This application is a continuation-in-part of our co-pending application Serial No. 219,751, filed April 6, 1951, later abandoned.

NITRILES

|  | Sap.# | Acid # | Charge Stock Description | |
|---|---|---|---|---|
|  |  |  | Percent N | I₂ # |
| Free Acid for Nitrile A | 192 | 92 |  | 5 |
| Nitrile A, Dual Extracted | 38 | 7 | 2.6 | 38 |
| Free acid for Nitrile B | 219 | 101 |  | 4 |
| Nitrile B, Alcohol Extracted | 7 | 7 | 3.5 | 31 |

NITRILE A DISTILLATION

| Cut # | 1 | 2 | 3 | 4 | 5 | 6 | 7 | 8 | 9 | Botts. |
|---|---|---|---|---|---|---|---|---|---|---|
| N percent | 4.96 | 3.77 | 2.98 | 2.32 | 2.10 | 1.80 | 1.69 | 1.74 | 1.84 | 2.54 |
| # C by N [1] | 17 | 25.5 | 32.5 | 42 | 49 | 54 | 58 | 57 | 53 | 38.5 |
| B. Pt. at 2 mm | 439 | 478 | 536 | 576 | 603 | 640 | 640 | 630 | 635 |  |
| # C by B. Pt. °F | 25 | 28 | 34 | 39 | 41 | 46 | 46 | 44 | 45 |  |
| Percent C | 80.1 | 81.5 | 82.0 | 82.5 | 82.4 | 82.9 | 83.3 | 83.4 | 84.3 | 85.3 |
| Percent H | 12.3 | 12.9 | 13.1 | 13.0 | 13.0 | 13.2 | 13.2 | 12.8 | 12.6 | 10.0 |
| I₂ # | 25.3 | 21.1 | 29.2 | 30.4 | 35.4 | 33.2 | 45.3 | 51.8 | 50.5 | 0.0 |
| Vol. percent | 8 | 8 | 8 | 8 | 8 | 8 | 8 | 8 | 6 | 30 |

NITRILE B DISTILLATION

| Cut # | 1 | 2 | 3 | 4 | 5 | Botts. |
|---|---|---|---|---|---|---|
| N percent | 6.37 | 4.58 | 3.25 | 2.70 | 2.60 | 5.95 |
| # C by N [1] | 15 | 21 | 30 | 36 | 37.5 | 16 |
| B. Pt. at 2 mm. °F | 354 | 442 | 538 | 599 | 646 |  |
| # C by B. Pt. °F | 19 | 25 | 34 | 40 | 47 |  |
| Percent C | 80.5 | 81.1 | 82.9 | 83.3 | 84.2 | 83.2 |
| Percent H | 12.3 | 12.7 | 13.5 | 13.4 | 13.3 | 11.6 |
| I₂ # | 21.8 | 21.4 | 18.5 | 22.0 | 32.9 | 34.8 |
| Vol. percent | 8 | 8 | 8 | 8 | 8 | 60 |

[1] This calculation was made on the basis of mononitriles. Higher C number values are listed for completeness only.

We claim:
1. A high molecular weight light colored nitrile composition comprising nitriles containing at least 18 carbon atoms prepared from purified carboxy acids of at least 18 carbon atoms per molecule obtained by the controlled oxidation of microcrystalline wax containing 34 to 55 carbon atoms per molecule by continuously introducing an excess of gaseous ammonia into the purified carboxy acids in liquid phase in a reaction zone in the presence of a substantial excess of the stoichiometric amount of water required to hydrolyze the esters contained in the purified carboxy acids, heating and stirring the mixture during ammoniation to a temperature in the range of about 90° to 95° C., maintaining this temperature for about 45 to 60 minutes, raising the temperature to about 290° to 310° C. and removing the added water not absorbed in the reaction mass and the water formed by the reaction from the reaction zone in the form of vapor.

2. A process for preparing a high molecular weight nitrile composition from purified carboxy acids of at least 18 carbon atoms per molecule obtained by the controlled oxidation of microcrystalline wax containing 34 to 55 carbon atoms per molecule which comprises continuously introducing an excess of gaseous ammonia into the purified carboxy acids in liquid phase in a reaction zone in the presence of a substantial excess of the stoichiometric amount of water required to hydrolyze the esters contained in the purified carboxy acids, heating and stirring the mixture during ammoniation to a temperature in the range of about 90° to 95° C., maintaining this temperature for about 45 to 60 minutes, raising the temperature to about 290° to 310° C. and removing the added water not absorbed in the reaction mass and the water formed by the reaction from the reaction zone in the form of vapor.

3. A process for preparing a high molecular weight nitrile composition from purified carboxy acids of at least 18 carbon atoms per molecule obtained by the controlled oxidation of microcrystalline wax containing 34 to 55 carbon atoms per molecule which comprises continuously introducing an excess of gaseous ammonia into the purified carboxy acids in liquid phase in a reaction zone in the presence of about 1–10 moles of water per mole of acid, heating and stirring the mixture during ammoniation to a temperature in the range of about 90° to 95° C., maintaining this temperature for about 45 to 60 minutes, raising the temperature to about 290° to 310° C. and removing the added water not absorbed in the reaction mass and the water formed by the reaction from the reaction zone in the form of vapor.

4. A process according to claim 2 in which the introduction of gaseous ammonia is discontinued for the period required to raise the temperature from about 150° to about 250° C.

References Cited in the file of this patent

UNITED STATES PATENTS

| | | |
|---|---|---|
| 1,931,859 | Beller et al. | Oct. 24, 1933 |
| 2,052,165 | Carrier et al. | Aug. 25, 1936 |
| 2,061,314 | Ralston et al. | Nov. 17, 1936 |
| 2,160,578 | Schmidt | May 30, 1939 |
| 2,299,755 | Jolly | Oct. 27, 1942 |
| 2,300,291 | Jolly | Oct. 27, 1942 |

FOREIGN PATENTS

| | | |
|---|---|---|
| 701,269 | Germany | Jan. 14, 1941 |

OTHER REFERENCES

Pieverling: Beilstein (Handbuch, 4th ed.), vol. 2, 1st sup., page 185 (1929).

Leune et al.: Beilstein (Handbuch, 4th ed.), vol. 2, 2nd sup., page 380 (1942).